US010769350B2

(12) United States Patent
Meyers, Jr. et al.

(10) Patent No.: US 10,769,350 B2
(45) Date of Patent: Sep. 8, 2020

(54) DOCUMENT LINK PREVIEWING AND PERMISSIONING WHILE COMPOSING AN EMAIL

(71) Applicant: Microsoft Corporation, Redmond, WA (US)

(72) Inventors: David Lloyd Meyers, Jr., Bellevue, WA (US); David Paul Limont, Seattle, WA (US); Kenneth Fern, Bellevue, WA (US); Michael Palmer, Edmonds, WA (US); Betsy Yu-pui McIntyre, Redmond, WA (US); Mirela Correa, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 14/095,633

(22) Filed: Dec. 3, 2013

(65) Prior Publication Data
US 2015/0154156 A1    Jun. 4, 2015

(51) Int. Cl.
*G06F 17/00* (2019.01)
*G06F 40/134* (2020.01)
(Continued)

(52) U.S. Cl.
CPC .......... *G06F 40/134* (2020.01); *G06F 40/106* (2020.01); *G06Q 10/107* (2013.01); *H04L 51/18* (2013.01); *H04L 51/08* (2013.01)

(58) Field of Classification Search
CPC .. G06F 17/2235; G06F 40/134; G06F 40/106; G06Q 10/107; H04L 51/08; H04L 51/18
(Continued)

(56) References Cited

U.S. PATENT DOCUMENTS

| 7,369,260 B2 * | 5/2008 | Buschi ................ G06Q 10/107 358/1.15 |
| 7,549,129 B2 | 6/2009 | Sheldon et al. |

(Continued)

OTHER PUBLICATIONS

Ryan, "Shared Links Overview and FAQs", Published on: Jan. 20, 2012, Available at: https://support.box.com/entries/20894888-Shared-Links-Overview-and-FAQs.
(Continued)

*Primary Examiner* — Laurie A Ries
(74) *Attorney, Agent, or Firm* — Talem IP Law, LLP

(57) ABSTRACT

Enhanced links in a message composition surface are described. A uniform resource locator (URL) may be identified while a user is composing a message in a message composition surface of an electronic message such as an email. A source of the URL and the file type of the document linked to by the URL can be determined and a preview of the document can be rendered in the message composition surface. When the source is a cloud storage location, access permissions for the document can be adjusted from within email—without the user navigating to a file management site of the cloud storage. When the file type is a productivity application, a link rendering element can call a productivity application service to provide interaction functionality for the productivity application file and facilitate the rendering of the productivity application file.

21 Claims, 9 Drawing Sheets

(51) Int. Cl.
*G06Q 10/10* (2012.01)
*H04L 12/58* (2006.01)
*G06F 40/106* (2020.01)

(58) Field of Classification Search
USPC .................................................. 715/205
See application file for complete search history.

(56) References Cited

U.S. PATENT DOCUMENTS

| | | | | |
|---|---|---|---|---|
| 8,700,719 | B1* | 4/2014 | Covitz | G06Q 10/107 |
| | | | | 709/204 |
| 8,935,768 | B1 | 1/2015 | Tyree | |
| 9,026,935 | B1* | 5/2015 | Rasmussen | H04L 51/04 |
| | | | | 715/764 |
| 9,923,851 | B1* | 3/2018 | Sprauve | H04L 67/02 |
| 10,129,197 | B2 | 11/2018 | Liberty et al. | |
| 2004/0068545 | A1* | 4/2004 | Daniell | G06Q 10/107 |
| | | | | 709/206 |
| 2004/0073705 | A1* | 4/2004 | Madril, Jr. | G06F 16/958 |
| | | | | 709/245 |
| 2004/0243926 | A1 | 12/2004 | Trenbeath et al. | |
| 2005/0251748 | A1* | 11/2005 | Gusmorino | G06F 16/168 |
| | | | | 715/713 |
| 2006/0265458 | A1* | 11/2006 | Aldrich | G06Q 10/107 |
| | | | | 709/206 |
| 2008/0024465 | A1 | 1/2008 | Hawkins et al. | |
| 2008/0052633 | A1* | 2/2008 | Kubo | G06Q 10/107 |
| | | | | 715/752 |
| 2009/0254529 | A1* | 10/2009 | Goldentouch | G06F 16/9535 |
| 2010/0057864 | A1* | 3/2010 | Laird-McConnell | |
| | | | | G06F 16/9577 |
| | | | | 709/206 |
| 2012/0084644 | A1 | 4/2012 | Robert et al. | |
| 2012/0254321 | A1* | 10/2012 | Lindsay | G06Q 10/107 |
| | | | | 709/206 |
| 2012/0278402 | A1* | 11/2012 | Limont | G06Q 10/107 |
| | | | | 709/206 |
| 2012/0278404 | A1* | 11/2012 | Meisels | G06Q 10/107 |
| | | | | 709/206 |
| 2012/0284344 | A1* | 11/2012 | Costenaro | G06F 40/169 |
| | | | | 709/206 |
| 2012/0284639 | A1* | 11/2012 | Yuniardi | G06Q 10/00 |
| | | | | 715/752 |
| 2013/0031208 | A1* | 1/2013 | Linton | G09B 7/02 |
| | | | | 709/217 |
| 2013/0067594 | A1 | 3/2013 | Kantor et al. | |
| 2013/0117376 | A1* | 5/2013 | Filman | G06Q 10/107 |
| | | | | 709/205 |
| 2013/0238725 | A1 | 9/2013 | Trinh et al. | |
| 2013/0275398 | A1 | 10/2013 | Dorman et al. | |
| 2013/0318448 | A1* | 11/2013 | O'Shaugnessy | H04L 51/04 |
| | | | | 715/752 |
| 2014/0344658 | A1* | 11/2014 | Srinivasan | G06F 40/134 |
| | | | | 715/205 |
| 2014/0351697 | A1* | 11/2014 | Robert | G06F 9/445 |
| | | | | 715/273 |
| 2015/0143211 | A1* | 5/2015 | Kaufthal | G06F 40/134 |
| | | | | 715/205 |
| 2015/0149930 | A1 | 5/2015 | Walkin et al. | |
| 2015/0154156 | A1* | 6/2015 | Meyers, Jr. | G06F 40/134 |
| | | | | 715/205 |
| 2016/0065555 | A1 | 3/2016 | Branden et al. | |
| 2018/0191652 | A1 | 7/2018 | Goel et al. | |
| 2019/0019154 | A1 | 1/2019 | Girdhar | |

OTHER PUBLICATIONS

Chitu, Alex, "Preview Google Documents Inside Gmail", Published on: Oct. 15, 2009, Available at: http://googlesystem.blogspot.in/2009/10/preview-google-documents-inside-gmail.html.

Horowitz, Paul, "Preview a URL Directly in Mail for Mac OS X", Published on: Apr. 17, 2012, Available at: http://osxdaily.com/2012/04/17/preview-a-url-directly-in-mail-for-mac-os-x/.

"Preview Links before You Click", Published on: Jun. 11, 2009, Available at: http://www.komando.com/downloads/category.aspx?id=6792.

Dixit, Chandramouli, "How to Preview Links in Google Chrome without Clicking on Them", Published on: Jun. 17, 2013, Available at: http://www.dcommonman.com/preview-links-in-google-chrome/392/.

"Email-a-File", Retrieved on: Sep. 5, 2013, Available at: https://help.yammer.com/entries/21238143-Email-a-File.

"International Search Report & Written Opinion Received for PCT Application No. PCT/US2014/067513", dated Apr. 30, 2015, 12 Pages.

"Search Report Issued in European Patent Application No. 14819170.3", dated Jul. 5, 2017,11 Pages.

"First Office Action and Search Report Issued in Chinese Patent Application No. 201480066172.7", dated Jan. 26, 2018, 14 Pages.

"Second Office Action Issued in Chinese Patent Application No. 201480066172.7", dated Aug. 15, 2018, 12 Pages.

"OneDrive Dev Center", Retrieved From: https://developer.microsoft.com/en-us/onedrive, Retrieved on: Dec. 14, 2017, 5 Pages.

"Overview of crawled and managed properties in SharePoint Server 2013", Retrieved From: https://technet.microsoft.com/en-us/library/jj219630.aspx, Retrieved on: Dec. 14, 2017, 25 Pages.

"Final Office Action Issued in U.S. Appl. No. 15/844,315", dated Oct. 3, 2019, 35 Pages.

"Non Final Office Action Issued in U.S. Appl. No. 15/844,315", dated Mar. 22, 2019, 21 Pages.

Caputo, et al., "Using the SharePoint search Query APIs", Retrieved From: https://docs.microsoft.com/en-us/sharepoint/dev/general-development/using-the-sharepoint-search-query-apis, Sep. 25, 2017, 10 Pages.

Ryan, Gregg, "Get a DriveItem Resource", Retrieved From: https://dev.onedrive.com/items/get.htm, Sep. 10, 2017, 6 Pages.

* cited by examiner

DOCUMENT LINK PREVIEWING AND PERMISSIONING WHILE COMPOSING AN EMAIL

BACKGROUND

One way in which a user commonly shares documents with other users is by navigating to the file in a file storage system, such as Microsoft® SkyDrive® and Dropbox™, copying a link to the document, and then pasting the link or location uniform resource locator (URL) into an email message.

However, the existing methods of sharing files via URL do not allow the email sender to easily view or interact with the document in the compose environment. Additionally, if the recipient requires permissions or privileges to see or edit the file, the email sender must navigate to the file using a separate interface to adjust the permissions, a complex and time-consuming operation for many users.

BRIEF SUMMARY

Enhanced links in a message composition surface are described. When a uniform resource locator (URL) is included in a message being composed, not only may the URL be turned into a link, but a preview of the content at the URL can be included within the message composition surface. In some scenarios, this preview allows the sender to interactively navigate a linked document and even make changes.

When the URL is to a cloud storage location, the preview of the content can further enable permissions to be set in order for a recipient to be granted access to the document without the sender/composer having to separately adjust permissions at the cloud storage site. In some embodiments, the access permissions of the recipients can be modified to enable read-only or editing permissions (and in some cases whether a user is required to log in before access is granted). In some cases, a user interface is provided to allow the sender to specify each recipient's access permissions individually.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2A-2C illustrate inserting and identifying a URL in a message compose interface; and FIGS. 3A and 3B illustrate example user interfaces showing static and interactive previews, respectively.

DETAILED DESCRIPTION

Figure 1:
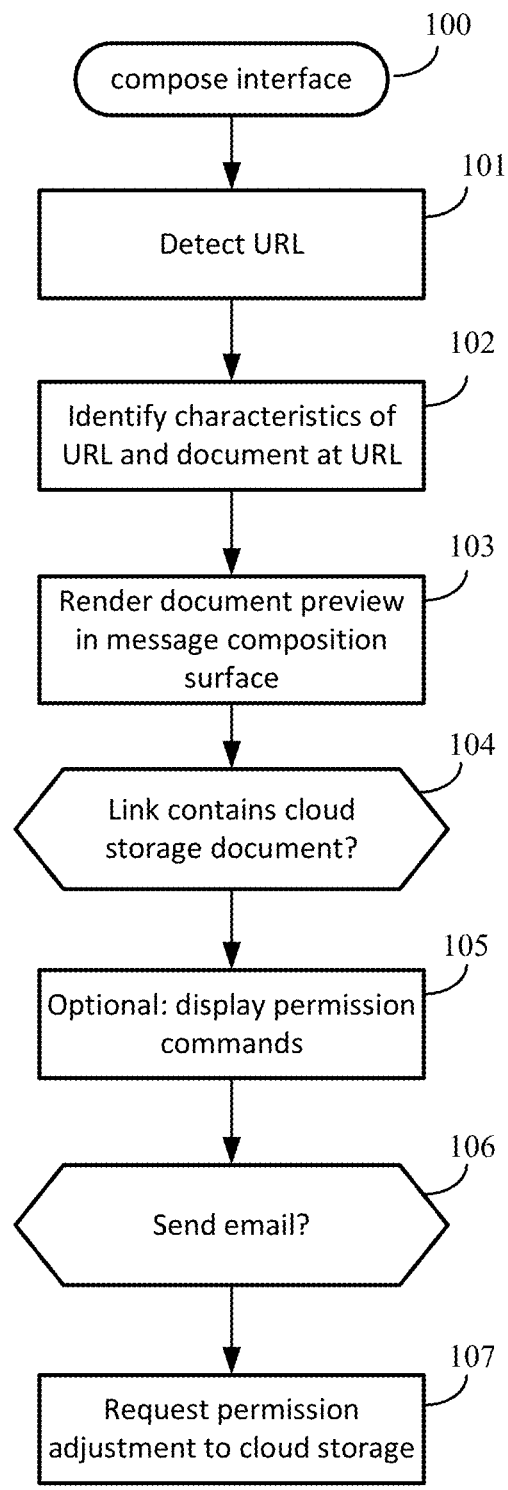
FIG. 1 illustrates a process flow diagram for document link previewing and permissioning.

Enhanced links in a message composition surface are described. An electronic message sender who includes a link to a document while composing an electronic message is presented with a preview of the document. This preview may be interactive such that the sender may navigate and edit the document while within the message composition surface. In addition, when the link is to a document stored via a cloud storage provider, the preview may further enable the sender to adjust recipient permissions on the document while within the electronic message interface.

A link refers to a word, group of words, or image that can be used, when "clicked," to jump to another document. The link includes, as one of its attributes, a URL indicating the source of the document (e.g., the destination of the jump). The email client can, from the message composing interface, recognize that a URL has been included.

"Cloud storage" is a type of networked storage where data is stored in virtualized pools of storage, spanning across multiple servers and multiple locations. The networked storage may include permanent, semi-permanent media, or both upon which to save and load files and documents. These networked storage pools are often operated by companies with large data centers, such as Amazon.com Inc. or Google Inc. End users and companies may then lease storage capacity from them. The purchasers of these storage pools connect to them using the internet or, less frequently, over private networks.

"Cloud storage providers" are companies which provide cloud storage services to end-user consumers. These companies enhance the ease of interaction with the cloud storage pools by providing applications on various computing platforms such as desktop computers, tablets, and smartphones. Some examples of cloud storage providers are Microsoft SkyDrive®, Google Drive™, Box™, and Dropbox™. Typically, cloud storage providers install applications on the local device. These applications integrate with the remote cloud storage devices to explore, upload, and synchronize files. These services also typically have a web browser interface to the stored files which allows the user to control them when the provider's interface application is not installed on the local device.

An "email client" or "email application" refers to a program that enables a user to access the user's email. The email client may be a local application running on the user's computing device or a web application accessed by the user via a browser running on the user's computing device.

Example email clients that may implement the techniques and features herein include, but are not limited to, Microsoft Outlook®, IBM Lotus Notes®, Apple® Mail, Google Gmail®, Outlook.com, and Yahoo!® Mail. Email and other electronic messaging services are often incorporated into personal information managers which provide additional services such as calendaring, task management, and contact management.

Although email clients are specifically described herein for implementing the enhanced link features, other messaging services and modalities may also implement the described techniques and features. Thus, embodiments may be implemented in a variety of electronic messaging applications.

For example, embodiments can be implemented as part of any software or firmware which provides electronic messaging services to an end-user. An "electronic messaging application" refers to any application or user interface which allows the sending of electronic messages (such as email) to other recipients over local networks or internetworks.

Presently, when a URL string is recognized in an email that is being composed, the URL string may be automatically turned into a clickable link. Instead of (or in addition to) turning a URL string into a clickable link, embodiments provide an enhanced link by rendering a preview of the URL while a user is within a composition surface of a message. That is, embodiments provide a sender/composer-side preview and functionality for a link before a message is sent.

As described herein, when a URL string is detected in a message, for example upon a user entering a URL string via insertion of a link, pasting a URL string, or typing the URL string, a link rendering element can be launched within the composition surface of the message and the URL may be rendered as a preview within the link rendering element for display in the body of the message.

For example, if the URL is to a website, the HTML of the site (the HTML document) may be rendered in place. If the URL is to a document stored at cloud storage location, the file or document at the location may be rendered in place using a web application component for enabling the viewing of a document format such as a word processing document format, a presentation document format, and a spreadsheet document format. In this manner, the email application (or other message application) can enable a sender of an email to preview documents of effectively any file type from within the message composition surface.

The preview of the URL may be interactive so that a sender of the message can interact with the document while within the compose surface. The preview presented within the message body may be interactive in that the sender may page through the document, zoom in and out, and edit, highlight or otherwise modify content in the document. User interface elements may surface along with the preview to enable one or more of the interactive features to be accomplished.

Embodiments described herein enable a user to seamlessly insert a link to a document from a document repository (such as cloud storage) into an email, then preview and navigate through the file in place without leaving the compose surface of the email message. This enables the sender to enter a URL (e.g., via text or voice) or drop or paste a document link into an email and then navigate the document without having to return to the storage provider or other location of the document.

Further embodiments seamlessly modify permissions to the document so that the sender can adjust permissions for the recipients while within the compose surface instead of at the storage provider. This functionality enables the sender to adjust recipient permissions on the document without having to leave the email composition surface or having to use the potentially difficult and confusing permissions editor native to the storage provider.

Figure 2A:
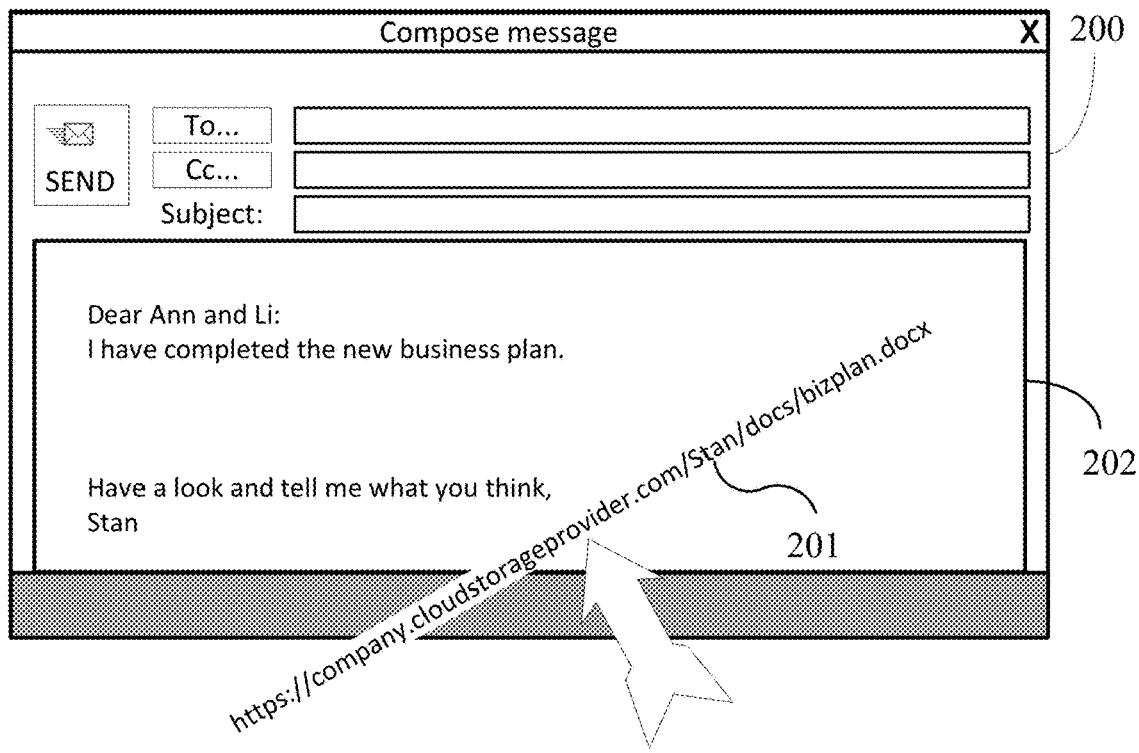
FIGS. 2A, 2B, 2C, 3A, and 3B illustrate an example process flow and user interfaces in which a preview of a document link is displayed.
Figure 2B:
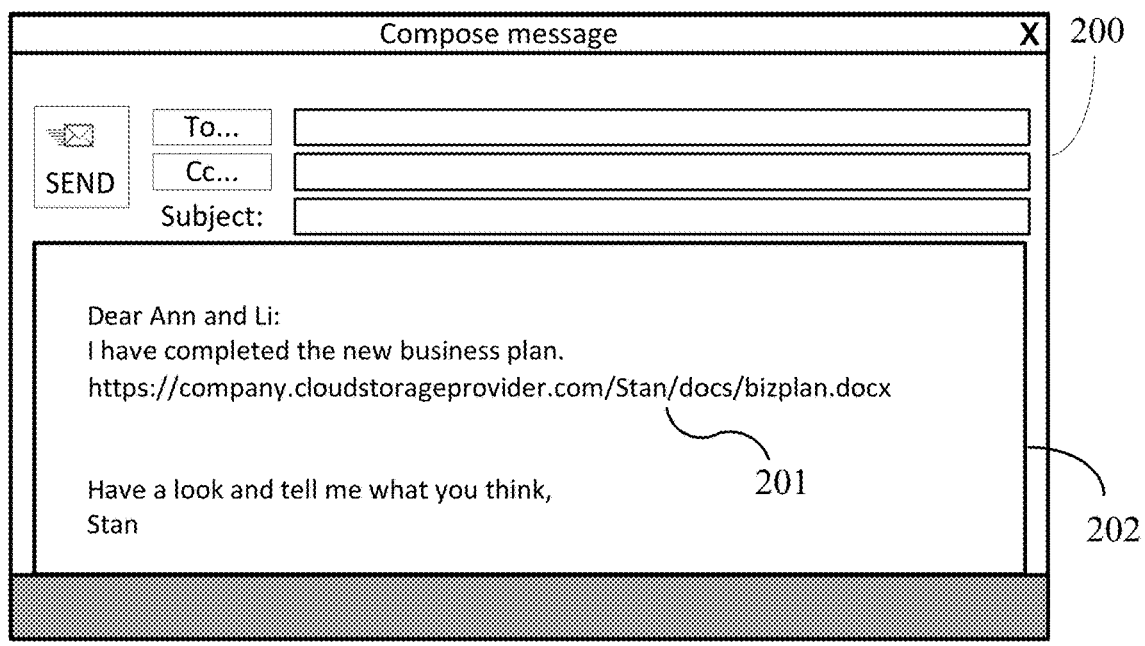
Figure 2C:
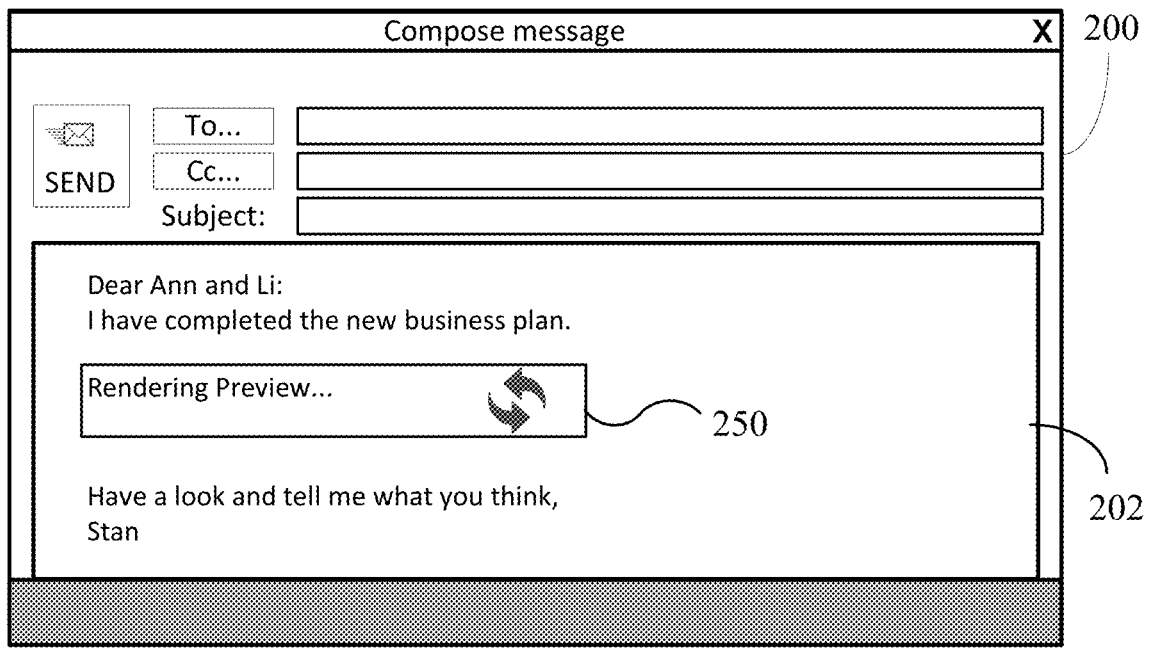
Figure 3A:
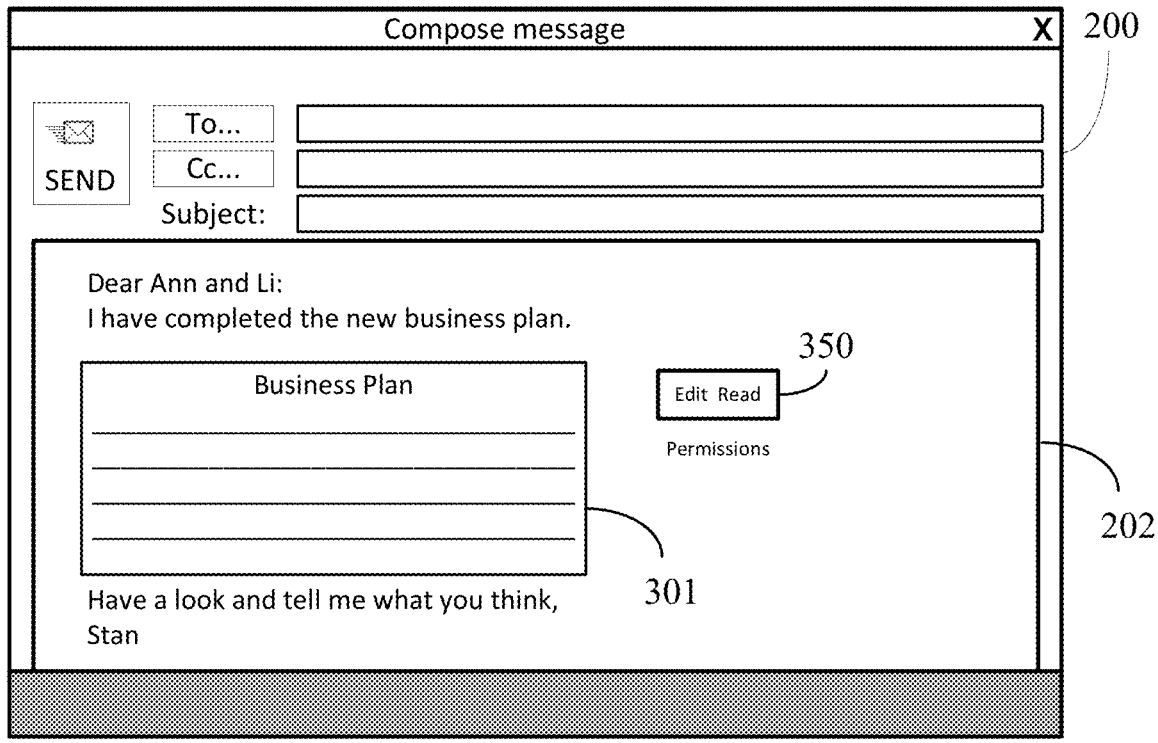
Figure 3B:
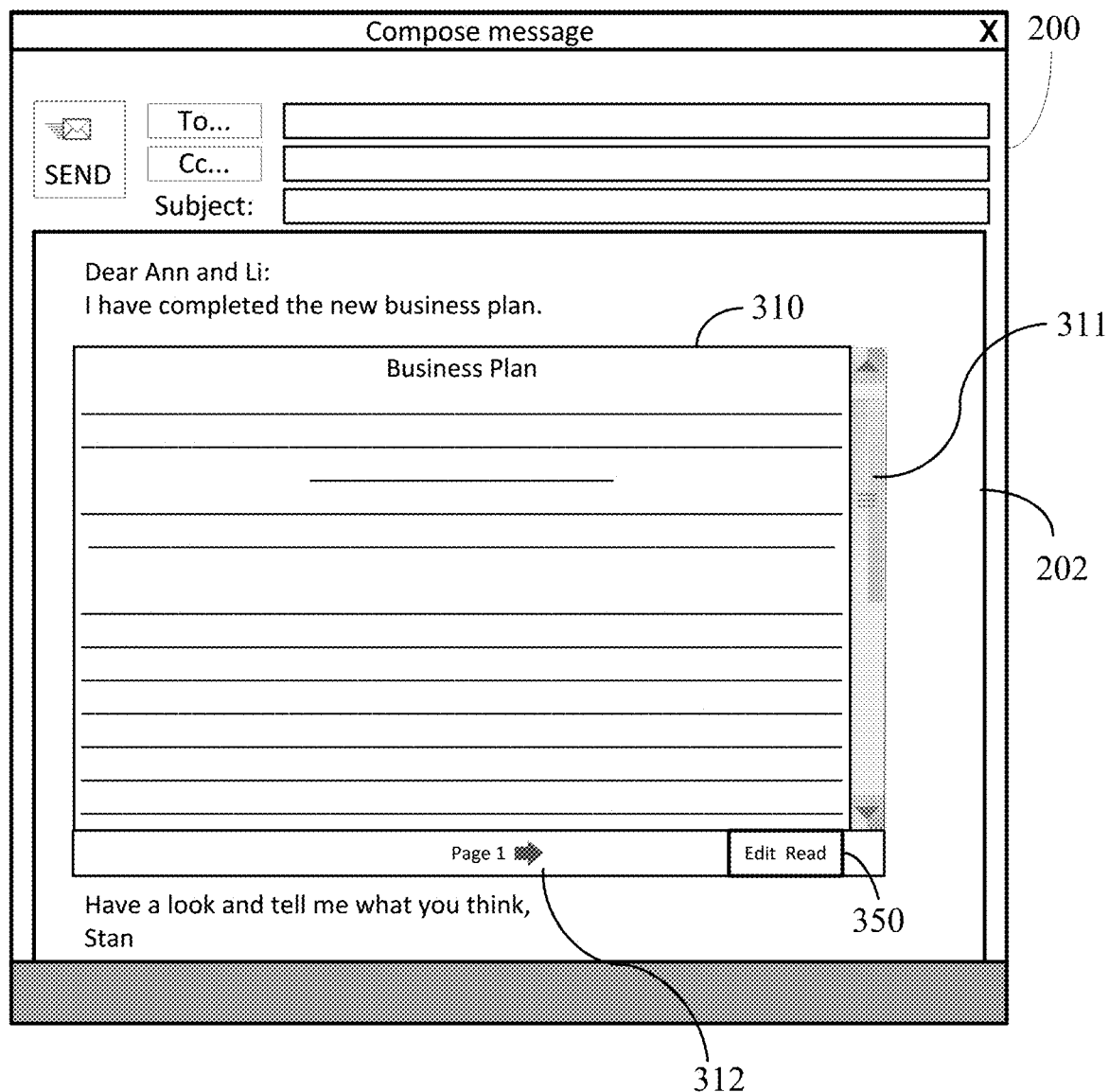

FIG. 1 illustrates a process flow diagram for document link previewing and permissioning. FIGS. 2-3 illustrate an example process flow and user interfaces in which a preview of a document link is displayed. FIGS. 2A-2C illustrate inserting and identifying a URL in a message compose interface; and FIGS. 3A and 3B illustrate example user interfaces showing static and interactive previews, respectively. Although reference is made to a link to a document, links may also be made to a file; files may also be previewed within the message compose surface.

Referring to FIG. 1, while presenting a compose interface for a messaging application (100), the insertion of a URL can be detected (101).

Any input to a message composition surface from the message compose interface, for example via a menu command (e.g., insert object), voice, drop and drag, keyboard (or keypad) entry, or paste, can be analyzed to identify the presence of a URL. A URL can be identified in a compose surface interface through various detection techniques that process content to determine the existence of a link. These techniques can include statistical analysis, term matching, and other detection techniques alone or in combination. In some cases, where the link is inserted through a command to insert a link that may be available in an email application, the link may be flagged or identified without performing a separate process to identify the existence of the link.

FIG. 2A illustrates an example representation of an email compose screen 200 in which a document link insertion may occur. The email compose surface may exist within an electronic messaging application running directly on or indirectly via a browser running on a computing device. The user's computing device may be, but is not limited to, a personal computer, a laptop computer, a desktop computer, a tablet computer, a reader, a mobile device, a personal digital assistant, a smart phone, a gaming device or console, or a smart television. It should be noted that, while the email compose screen 200 is depicted as part of a "new message" composition surface, the same process flow of FIG. 1 is also applicable to a "reply" or "forward" composition surface.

The document link may be inserted by the user in numerous ways. In the example of FIG. 2A, the user places a textual representation of the URL 201 for the document to be shared on the compose surface 202 of the email. The placement of the textual representation of the URL may occur by "pasting" plain text from a browser or other application. A user may also type the URL into the compose surface 202.

Placement may also occur by "dragging and dropping" a block of text from a word processor, browser, file manager, or other textual source. The user interface motifs of pasting text using a keyboard, menu, command button, or voice command, and of dragging and dropping text using a mouse or gestural command, are known in the art. Furthermore, as those skilled in the art will recognize, the determination that a user input command has occurred can be performed using any suitable detection method supported by an operating system or software development kit.

FIG. 2B shows the text of the URL 201 having been placed by the user.

Returning to FIG. 1, once a URL is detected (101), characteristics of the URL and the document at the URL can be identified (102) and a document preview can be rendered in the message composition surface (103).

The text or link may be examined for a reference to a document located in cloud storage. In some embodiments, text will have been typed, dropped, or pasted by the user onto the compose surface. In some implementations, the text may be "parsed" or dissected into smaller textual pieces which fit known patterns. These smaller textual elements may enable the system to determine whether the text contains a file URL to a document type which the system can retrieve, and whether that document is located on a supported cloud storage provider.

Methods known in the art enable the parsing of text according to defined patterns. For example, many computing devices implement application programming interfaces which assist in the parsing, analysis, and comparison of textual elements to known textual patterns. One example of such a programming interface is a "regular expression engine," which assists in the matching of a series of letters and symbols in a given text (in this case, the link URL) to known pattern templates. Examples of regular expression engines are Perl, PCRE, PHP, .NET, Java, JavaScript, XRegExp, VBScript, Python, Ruby, Delphi, R, Tcl, and POSIX, available across a variety of computing devices. Other methods of matching a series of letters and symbols to a known pattern are possible.

In some embodiments, parsing must be performed to determine if the text contains a link to a file. One method is to determine if the text contains the identifying characters "www", "http://", or "https://", indicating that a URL might be present within the text. The pattern matching techniques described above may assist in identifying the presence of such textual indicators.

In some embodiments, the text is also analyzed to determine if the text contains a link to a document which is located on an accessible cloud storage provider. As described above, cloud storage providers can issue URLs to documents for which sharing is desired. One part of the pattern which is identifiable is the "domain name" of the cloud storage provider. Common domain names of cloud storage providers are "Box.com" and "skydrive.com". URLs to documents on known cloud storage providers typically have recognizable patterns which may be identified utilizing the pattern matching techniques described above. A configurable list of supported cloud storage providers and their URL textual patterns may be maintained in the registry or other settings configuration file, as is well-known in the art.

In some embodiments of an email compose surface, only certain document types may be able to be rendered as a preview. Therefore, one element of particular interest in parsing the text for a file URL is to recognize a supported document type. In some embodiments, document types can be identified by their "file extension," which is a series of letters or symbols at the end of the filename, sometimes after a final "period" symbol. The pattern matching techniques described above may assist in identifying the presence of supported document types. If a supported document type is not referenced in the link text, then the process flow may ignore the text in some embodiments.

A recognized file type can cause the email application to call a service component related to that file type and render the component within the compose surface. An example of a productivity application service component that may be called (or invoked) by the email application is a Microsoft® Office® Web Component (OWC) available from Microsoft Corp. The software running the OWC may be stored with or associated with the email application, hosted by another party, or hosted by a same party as that running or accessing the email application. The OWC may be embedded and used to display a productivity application document and enable interactive functionality. In one example scenario, if a .docx file is detected, a service may be called that is provided by FAST (Fast Search & Transfer ASA) to find related information to that document.

In some implementations, expansion of the textual file URL into a preview may occur as a background process wherein the connection to the cloud storage service and loading of preview-related data occurs while the sender continues typing the email message. In some implementations, a rendering timer such as a scrolling wheel or status bar may indicate the background loading of the preview. The example in FIG. 2C illustrates such a background loading and rendering indicator 250.

The nature of the data which is retrieved when rendering the document preview (103) depends on the nature of the preview which is to be rendered. A "static" preview would be a thumbnail or other static image which shows, for example, a snapshot of the first page of a document. In the thumbnail view, the page may be readable, but would not be editable or scrollable. However, an "interactive preview" would retrieve enough data to allow the sender to scroll through the document (and potentially additional functionality). In some implementations, the sender may make changes to the document because the messaging application maintains sufficient connectivity with the cloud storage provider to enable changes through the preview to be reflected in the source document on the storage service.

FIG. 3A illustrates an example in which the rendering of the preview of the document is shown as a static preview 301 inline to the body of the compose surface 202 of the email message. FIG. 3B illustrates an example in which the rendering of the preview of the document is shown as an interactive preview 310 inline to the body of the compose surface 202 of the email message. In the interactive preview 310, the document may be scrolled utilizing a scrollbar 311 operable through mouse or touch gesture. Alternatively, pages of the document may be incrementally rendered using a page navigator such as that depicted by 312. Many other types of navigation are possible depending on the device implementation and the navigation motifs required for a given document file type.

Returning to FIG. 1, if a reference to a cloud storage provider is found within the link (104) additional functionality can be included. In some cases, a communications link with the cloud storage provider may be initiated to retrieve sender permissions data for the document. A communications link with a cloud storage provider may be accessible to an electronic messaging application in any number of ways implemented by the underlying device operating system, or by programming frameworks layered atop it, including but not limited to an application programming interface (API).

The communications link enables the messaging application to "query" the cloud storage service for the permissions of the sending user and return the permissions. Some permissions may allow the sending user to view the document only; view and edit the document; or even to view, edit, and also delegate view and/or edit authority to another user. Other permission types are possible. FIGS. 3A and 3B illustrate example permission commands 350 that may surface in the interface when the URL is rendered.

As an example of application and cloud storage service integration, the cloud storage provider Box™ publishes an API which allows a messaging application to request permissions about a file using web-based command instructions. Various implementations of this general mechanism of requesting permissions through cloud storage service procedure calls are possible, depending on the implementation by the cloud storage service. Similarly, an API may be available from SkyDrive® and other providers.

Once the permissions of the sender have been retrieved, they can be validated for the authority to preview the document. If the composer has permission to preview the document, then data enabling the previewing of the document may be retrieved from a service component that facilitates the rendering of certain file types. In some cases, the service component may be available from the cloud storage provider utilizing similar web-based API calls to those described above in the description of permissions retrieval.

In some implementations, the sender can adjust permissions with respect to the document directly from the message composition interface. For example, permission commands can be included when the document from a cloud storage is rendered (105).

At any time during or after the rendering of the preview, the sender may complete and send the electronic message (106). Completion of the electronic message may involve, for example, inputting header information such as the recipients' e-mail address(es), a subject description, composing the text of the message body. Finally, the user may send the message or save the message as a draft, as is well known in the art.

For example, in response to receiving an indication to send the email (106), the electronic mail application can interact with a specified transport to transport the electronic mail message to a network which routes the electronic mail message to the designated recipients. In doing so, the electronic mail application typically accesses an address book stored in a database to obtain the fully qualified electronic mail address for the recipients. This may be done by calling a messaging application programming interface (MAPI) or other suitable API methods associated with the database storing the address book. Synchronization components may be included so that a user may have a consistent experience across various platforms and devices.

In various embodiments, as part of completing the email composition and sending task with the shared file link, recipients' permissions to access the file may be modified on the cloud storage provider. It is contemplated that multiple methods may initiate the process flow of modifying recipient permissions on the document, some of which modify the permissions automatically and some of which allow sender-selectable modification. However, in various cases, the modification may be requested (107) upon sending the email.

Figure 4A:
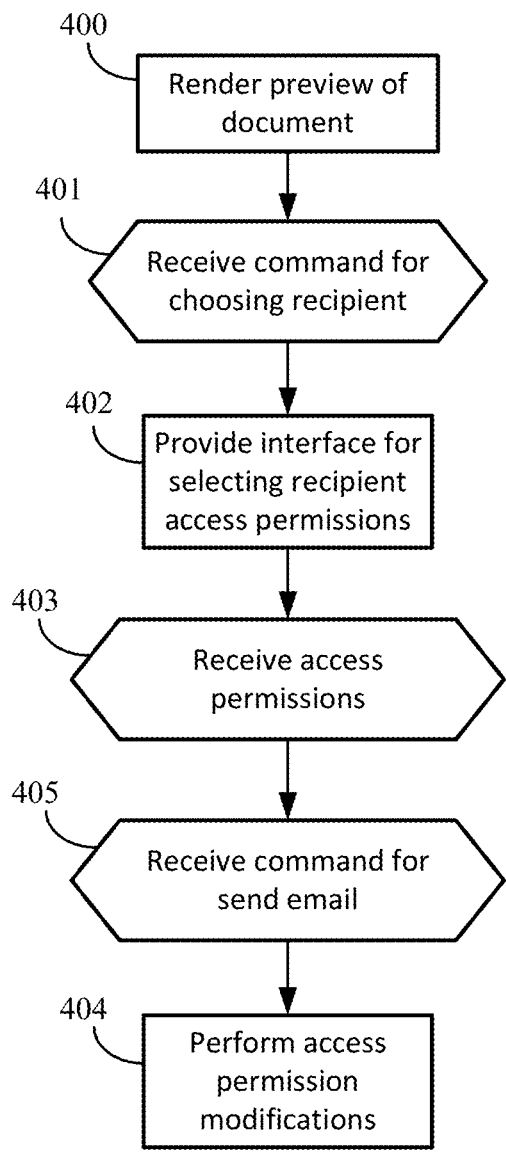
FIGS. 4A-4C illustrate process flows according to which a document's permissions may be modified from within an email application.
Figure 4B:
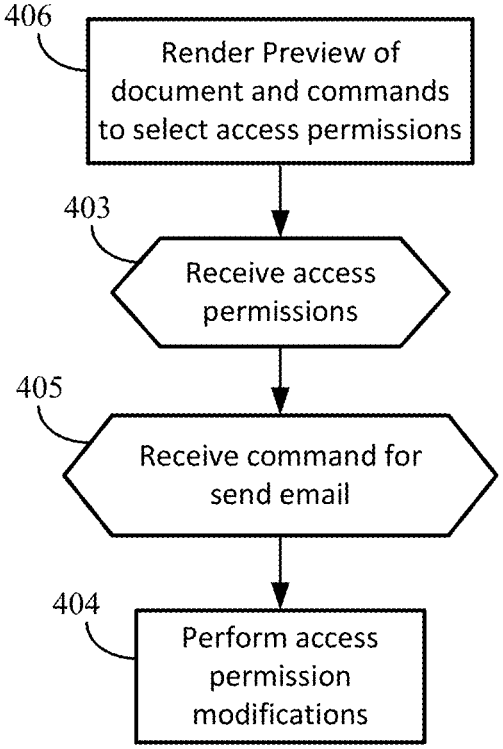
Figure 4C:
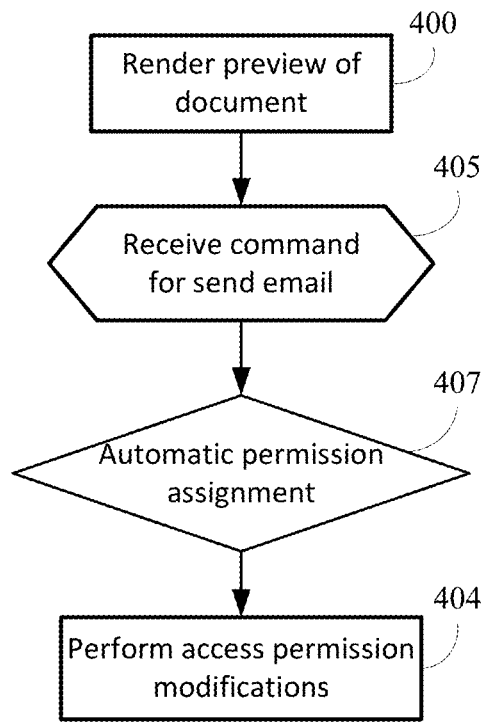
Figure 5A:
FIGS. 5A and 5B illustrate example user interfaces wherein recipient permissions can be set by the sender.
Figure 5B:
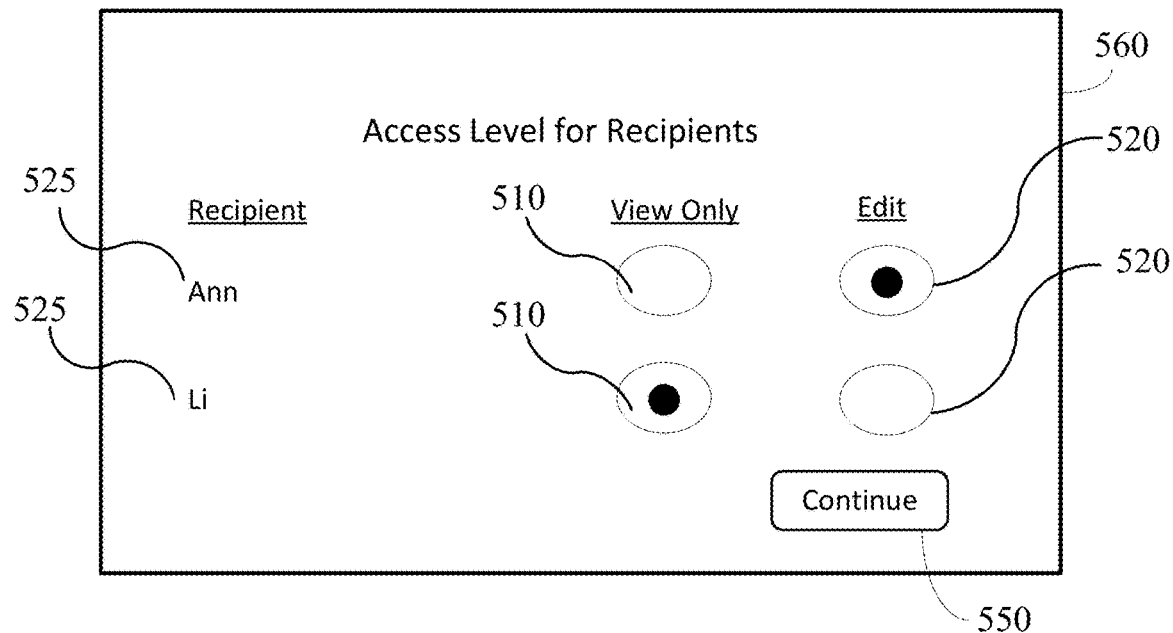

FIGS. 4A-4C illustrate process flows according to which a document's permissions may be modified from within an email application. FIGS. 5A-5C illustrate example user interfaces wherein recipient permissions can be set by the sender.

Referring to FIG. 4A, a preview of a document may be rendered (400). If the document is from a cloud storage location, the preview can also include recipient permission commands. The permission commands (e.g., 350 in FIGS. 3A and 3B; 510, 520 in FIGS. 5A-5C) may be rendered in or near the preview of the document. Other interface elements for beginning the process to choose recipient permissions are possible, including but not limited to right-click menu items.

In some cases, the permission settings may be set directly from the composition surface. In other cases, the permission command launches a secondary panel, window, or region of the composition surface in which specific permissions may be selected. For example, buttons 350 as depicted in FIGS. 3A and 3B may be used to set permissions for enabling editing or read only while within the composition surface, and buttons 510 and 520 as depicted in FIGS. 5A and 5B may be used to set permissions in a separate panel or window of the message application. It should be understood that although FIGS. 5A and 5B illustrate a separate interface that is launched to adjust permissions, the illustrated elements may be surfaced within the composition surface instead of in a separate panel or window.

For the implementation illustrated in FIGS. 5A and 5B, in response to receiving a user command (401) to set permissions (e.g., from a command in the message compose interface), an interface view depicting a selection of permissions may be provided (402).

In some embodiments, a two-level hierarchy of access permissions is contemplated: "view only" and "edit". "View only" enables the recipients only to view or read the document without changing it. "Edit" allows the recipients both to view and edit the document. It should be noted that the terms "view" and "edit" are labels only and are not limiting. In addition, other permissioning may be available. For example, the sender may be able to adjust permissions regarding whether a recipient must log in to view and/or edit a document. Anonymous access may also be available.

Available permissions for the recipients may be a factor of the available permissions to the sender. For example, in some cases, access privileges are available for assignment to recipients at an equivalent or lower level than the sender's own access privileges. In the two-level permission system, for example, a sender with "read only" permissions may not give recipients "edit" permissions. In some embodiments, the restrictions on assignment may be indicated via changes to the interface elements, such as by disabling the "edit" option button from selection when the sender lacks editing privileges.

Other and additional access permissions are possible in various implementations, depending on the desired recipient options and the number and type of permission levels assignable on the chosen cloud storage provider.

In some implementations, all recipients may be set to the same permissions. In some implementations, individual recipients may be given different permissions.

In the example shown in FIG. 5A, all recipients receive the same permissions; and the "edit" option is shown as selected. Interface view 500 illustrates the two-level hierarchy implemented as an options group containing the "view only" option 510 and the "edit" option 520. Selecting one option may de-select the other option.

In the example shown in FIG. 5B, different permissions may be chosen for each recipient. Interface view 560 illustrates a two-level permissions setting depicted as an options group 510 and 520 for each recipient 525. In the non-limiting example of FIG. 5B, one recipient receives only "view" privileges while the other receives "edit" privileges.

In other implementations, different interface elements are possible to show the permissions level, including but not limited to slider bars, shaded toggle buttons, and checkboxes.

In some implementations, a "continue" button 550 (FIG. 5A or 5B) can be selected to return the sender to the compose email view 200 after permissions are chosen. After receiving the requested access permissions (403), access permissions can be modified (404) by communicating with the cloud storage provider utilizing various mechanisms, such as web APIs. The communication between the message application and the cloud storage provider to request the permissions may occur after the message application receives an indication to send the message (405).

Alternative paths may be taken through the process flow of FIG. 4A, as well. For example, referring to FIG. 4B, it may be suitable to display the interface view for selecting recipient access permissions at the time the preview is rendered (406), rather than in response to a user interface command. Thus, after receiving access permissions (403)

and a command for sending the email (405), access permission modifications can be performed (404).

Furthermore, in some embodiments it may be suitable to bypass permission assignment altogether. For example, as illustrated in FIG. 4C, when the send mail command is received (405) but no manual setting of recipient permissions has yet been performed by the sender, permissions may be able to be altered automatically (407) for performing access permission modifications (404) according to certain defaults or other processing logic. For example, permissions choices may not be necessary when the sender only possesses "view" permissions to file and, thus, a system default may be to automatically assign "view" permissions unless it is not possible to determine the desired access permissions. The default for cases where there are multiple permission levels available may be to render a recipient permissions interface (e.g., 402 or 406). In some cases, the recipient permissions interface may be presented upon receiving the command to send the email.

Figure 6:
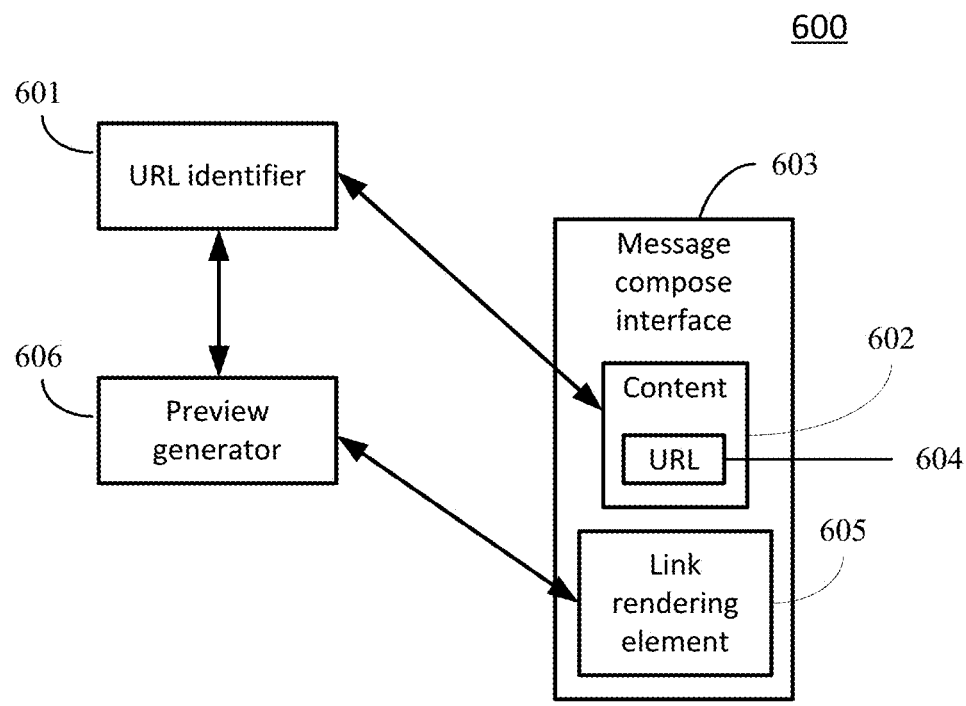
FIG. 6 illustrates an example software architecture that may implement the enhanced URL preview features described herein.

FIG. 6 illustrates an example software architecture that may implement the enhanced URL preview features described herein.

The software architecture 600 for the email application can include a URL identifier 601 that can process content 602 being entered into a message compose interface 603 to identify whether there is a URL string 604. The URL identifier 601 may look for patterns or particular characters and symbols that match or otherwise indicate that a string entered via the message compose interface is a URL. Once the existence of a URL is identified, the URL may be used to generate a preview of a document at the link. This may be accomplished through a link rendering element 605.

The software architecture 600 may further include a preview generator 606 that can include a set of software routines that generate previews of particular file types including, but not limited to, word processing files, presentation files, spreadsheet files, PDF files, image files, HTML files, and streaming media files (e.g., video). The link rendering element 605 can communicate with the preview generator 606 to render the preview in the message compose interface 603.

In some cases, the URL identifier 601 may also recognize a flag or other indicia of the existence of a URL in a message. The flag may be a tag or other metadata set by the email application when a link is inserted into the message through one of the available recognized commands to insert a link. In some cases, a process flow for inserting the link may launch the preview generator 606 automatically upon insertion of the link.

The preview generator 606 may determine the file type for the document at the link and select the appropriate software routine to generate a preview of the document. In some cases, the software routine may invoke a service that provides functionality for viewing and/or editing files of certain file types.

Figure 7:
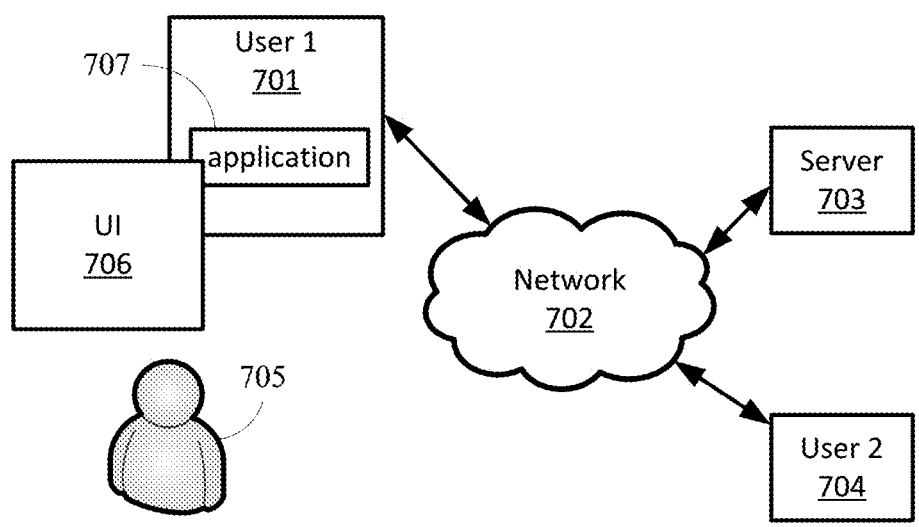
FIG. 7 shows an operating environment in which embodiments of the invention may be practiced.

FIG. 7 shows an operating environment in which embodiments of the invention may be practiced. It will be appreciated that the operating environment shown in FIG. 7 is merely one example configuration of a system configured to perform the actions described herein, and other configurations are also contemplated.

Referring to FIG. 7, an example operating environment can include a user computing device 701 operably coupled to a network 702 to communicate with one or more servers, such as server 703, as well as other user computing devices, such as user computing device 704.

The network 702 can be, but is not limited to, a cellular network (e.g., wireless phone), a point-to-point dial up connection, a satellite network, the Internet, a local area network (LAN), a wide area network (WAN), a WiFi network, an ad hoc network or a combination thereof. Such networks are widely used to connect various types of network elements, such as hubs, bridges, routers, switches, servers, and gateways. The network 702 may include one or more connected networks (e.g., a multi-network environment) including public networks, such as the Internet, and/or private networks such as a secure enterprise private network. Access to the network 702 may be provided via one or more wired or wireless access networks as will be understood by those skilled in the art.

Figure 8:
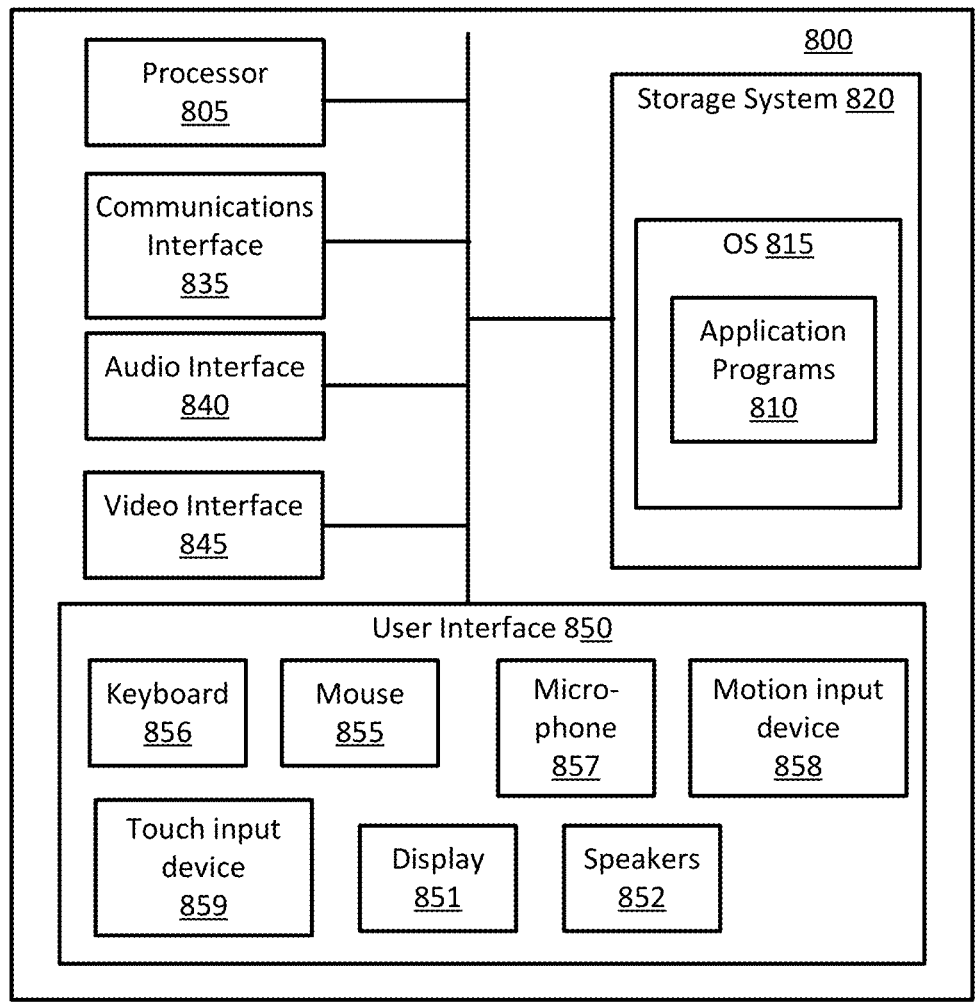
FIG. 8 is a block diagram illustrating components of a computing device or system used in some embodiments.

The user computing device 701 can be, but is not limited to, a personal computer (e.g. desktop computer), laptop, personal digital assistant (PDA), mobile phone (or smart phone), computer watch or glasses, tablet, slate, computing watch or glasses, or terminal of which computing system 800, discussed below with respect to FIG. 8, is representative.

The server 703 may be an enterprise server, cloud based server, dedicated server, host server, or the like. Certain aspects of the computing system 800 may be representative of server 703. The other user computing device(s), such as user device 704, can be, but is not limited to, a personal computer, laptop, PDA, mobile phone (or smart phone), tablet, slate, computing watch or glasses, or terminal, which may be used to access a server, such as server 703, and communicate with user computing device 701 and other user computing devices over a network 702.

It should be apparent that the user computing devices 701, 704 may each be any type of computer system that provides its user the ability to load and execute software programs and the ability to access a network, such as network 702, and communicate with one or more servers, such as server 703, as well as other user computing devices and each other. It should also be understood that communications between devices may be available over multiple networks, for example, cellular and WiFi.

A user computing device, e.g., the user computing device 701, is configured to receive input from a user 705, such as by voice, touch, and/or through a keyboard and/or mouse that is operably coupled to the first computing device 701. The user computing device 701 can further include a display (e.g., a computer monitor), that is configured to display one or more user interfaces 706 (including user interfaces 200, 500, and 560) to the user 705. In some embodiments, the display can be a touchscreen such that the user computing device 701 may receive user input through the display.

At least some of these user interfaces 706 include fields for initiating and/or continuing communications with one or more other entities (e.g., generally referred to herein as potential recipients and/or contacts). For example, in one embodiment, an email application is stored on the user computing device 701 (e.g., a client-side application).

In another embodiment, the user 705 may access a web-based email application, instant messaging application, and the like using a standard internet browser (as application 707), and the application's interface may be displayed to the user 705 within the internet browser. Thus, the application used to compose a meeting item (or other communication) and/or initiate a communication may be a client-side application and/or non-client side (e.g., a web-based) application.

When the application 707 is launched, a user interface 706 for the email application 707 may be presented to the user 705. The user 705 may prepare a message via the user interface 706 that may be sent to one or more recipients. Similarly, the recipients may view a received message via a user interface. While the particular arrangement of the user interface 706 and input field options may vary across different applications and products, embodiments of the invention are applicable to any user interface in which a message may be composed.

FIG. 8 shows a block diagram illustrating components of a computing device used in some embodiments. System 800 may be implemented within a single computing device or distributed across multiple computing devices or sub-systems that cooperate in executing program instructions. System 800 can be used to implement myriad computing devices, including but not limited to a personal computer, a tablet computer, a reader, a mobile device, a personal digital assistant, a smartphone, a laptop computer (notebook or netbook), a gaming device or console, a desktop computer, or a smart television. Accordingly, more or less elements described with respect to system 800 may be incorporated to implement a particular computing device.

System 800, for example, includes a processor 805 which processes data according to the instructions of one or more application programs 810 interacting with the device operating system (OS) 815. Examples of processers 805 include general purpose central processing units, application specific processors, and logic devices, as well as any other type of processing device, combinations, or variations thereof.

The application programs 810, OS 815 and other software may be loaded into and stored in a storage system 820. Device operating systems 815 generally control and coordinate the functions of the various components in the computing device, providing an easier way for applications to connect with lower level interfaces like the networking interface. Non-limiting examples of operating systems include Windows® from Microsoft Corp., IOS™ from Apple, Inc., Android™ OS from Google, Inc., Windows™ RT from Microsoft Corp., and the Ubuntu® variety of the Linux® OS from Canonical.

It should be noted that the OS 815 may be implemented both natively on the computing device and on software virtualization layers running atop the native Device OS. Virtualized OS layers, while not depicted in FIG. 8, can be thought of as additional, nested groupings within the OS 815 space, each containing an OS, application programs, and APIs.

Storage system 820 may comprise any computer readable storage media readable by the processor 805 and capable of storing software (e.g., application programs 810 and OS 815).

Storage system 820 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 820 may also include communication media over which software may be communicated internally or externally. Storage system 820 may be implemented as a single storage device but may also be implemented across multiple storage devices or sub-systems co-located or distributed relative to each other. Storage system 820 may comprise additional elements, such as a controller, capable of communicating with processor 805.

Software may be implemented in program instructions and among other functions may, when executed by system 800 in general or processor 805 in particular, direct system 800 or processor 805 to operate as described herein. Software may include additional processes, programs, or components, such as operating system software or other application software. Software may also comprise firmware or some other form of machine-readable processing instructions executable by processor 805.

In general, software may, when loaded into processor 805 and executed, transform computing system 800 overall from a general-purpose computing system into a special-purpose computing system customized to facilitate a share process flow as described herein for each implementation. Indeed, encoding software on storage system 820 may transform the physical structure of storage system 820. The specific transformation of the physical structure may depend on various factors in different implementations of this description. Examples of such factors may include, but are not limited to the technology used to implement the storage media of storage system 820 and whether the computer-storage media are characterized as primary or secondary storage.

For example, if the computer-storage media are implemented as semiconductor-based memory, software may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be noted that many elements of system 800 may be included in a system-on-a-chip (SoC) device. These elements may include, but are not limited to, the processor 805, communications interface 835, audio interface 840, video interface 845, and at least some memory associated with storage system 820.

Communications interface 835 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 815, which informs applications and APIs of communications events when necessary.

Figure 9:
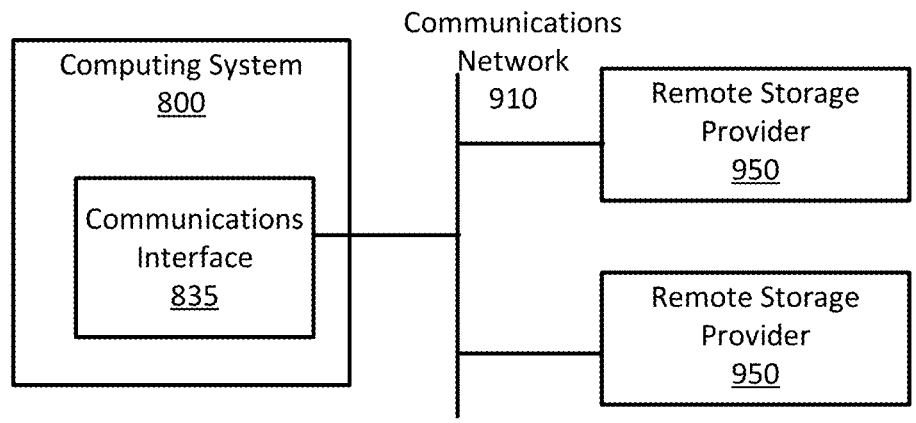
FIG. 9 depicts an architecture in which several computing devices are networked.

In various implementations, data or programming instructions utilized by system 800 may be stored on the computing device 825. However, as illustrated in FIG. 9, data or programming instructions may also be stored on any number of remote storage platforms 950 that may be accessed by the device over communication networks 910 via the communications interface 835. Such remote storage providers might include, for example, a server computer in a distributed computing network, such as the Internet. They may also include "cloud storage providers" whose data and functionality are accessible to applications through OS functions or APIs.

User interface 850 may include a input devices such as a mouse 855, track pad, keyboard 856, microphone 857, a touch device 859 for receiving a touch gesture from a user, a motion input device 858 for detecting non-touch gestures and other motions by a user, and other types of input devices and their associated processing elements capable of receiving user input.

Output devices such as a display 851, speakers 852, haptic devices for tactile feedback, and other types of output devices may be included in user interface 850. In certain cases, the input and output devices may be combined in a single device, such as a touchscreen display which both depicts images and receives touch gesture input from the user. Visual output may be depicted on the display 851 in myriad ways, presenting graphical user interface elements, text, images, video, notifications, virtual buttons, virtual keyboards, or any other type of information capable of being depicted in visual form. Other kinds of user interface are possible. User interface 850 may also include associated user interface software executed by the OS 815 in support of the various user input and output devices. Such software assists the OS in communicating user interface hardware events to application programs 810 using defined mechanisms.

It should be understood that computing system 800 is generally intended to represent a computing system with which software is deployed and executed in order to implement a messaging application with a share process flow as described herein. However, computing system 800 may also represent any computing system on which software may be staged and from where software may be distributed, transported, downloaded, or otherwise provided to yet another computing system for deployment and execution, or yet additional distribution.

Figure 10:
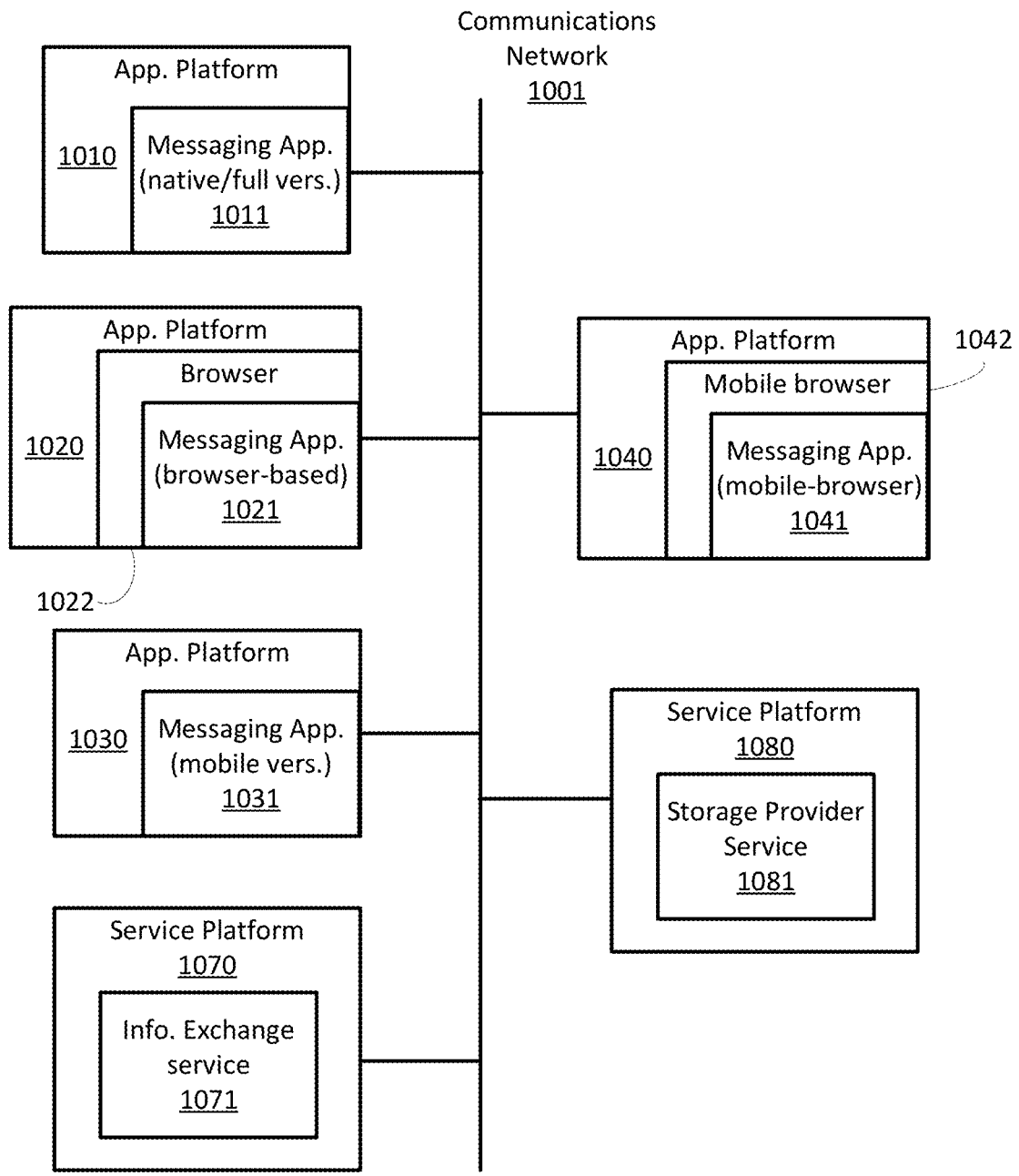
FIG. 10 illustrates example system architectures in which embodiments may be carried out.

FIG. 10 illustrates an application environment 1000 in which an electronic messaging application with the proposed improvements may be implemented utilizing the principles depicted in system 800 (FIG. 8) and discussed above. In particular, FIG. 10 shows various application platforms 1010, 1020, 1030, and 1040, each of which is capable of communicating with service platforms 1070 and 1080 over communications network 1001 to exchange messages and access storage devices. The application platforms 1010, 1020, 1030, and 1040 may be any computing apparatus, device, system, or collection thereof employing a computing architecture suitable for implementing the electronic messaging application (1011, 1021, 1031, 1041) on that platform.

Messaging application 1011 may be considered a full or "native" version that is locally installed and executed. In some cases, messaging application 1011 may operate in a hybrid manner whereby a portion of the application is locally installed and executed and other portions are executed remotely and then streamed to application platform 1010 for local rendering. Non-limiting examples of messaging application 1011 include Microsoft Outlook® and Mozilla Thunderbird™.

Messaging application 1021, implemented on application platform 1020, may be considered a browser-based version that is executed wholly or partly in the context of a browser application 1022. In this model, all or part of the programming instructions are executed remotely and the browser 1022 renders the result to the user's device through a visual expression language such as HTML. Non-limiting examples of messaging application 1021 include Outlook.com™, Gmail.com™, and Microsoft® Outlook Web App (OWA). Examples of the browser application 1022 include Google Chrome™, Microsoft Internet Explorer™, and Mozilla Firefox™.

Messaging application 1031 may be considered a mobile application version that is locally installed and executed on a mobile device. In some cases, messaging application 1031 may operate in a hybrid manner whereby a portion of the application is locally installed and executed and other portions are executed remotely and then streamed to application platform 1030 for local rendering. Non-limiting examples of mobile messaging applications 1031 include the Outlook.com App and the Gmail App.

Messaging application 1041, implemented on application platform 1040, may be considered a browser-based version that is executed wholly or partly in the context of a mobile browser application 1042. In this model, all or part of the programming instructions are executed remotely and the mobile browser 1042 renders the result to the user's device through a visual expression language such as HTML. Non-limiting examples of a mobile browser messaging application 1041 include mobile-device-enhanced views of content through Outlook.com™, Gmail™ and the Microsoft® Outlook Web App (OWA). Examples of the mobile browser application 1042 include Google Chrome™ and Mozilla Firefox™.

The application platforms 1010, 1020, 1030, and 1040 may communicate with service platforms 1070 and 1080 connected by network 1001. Service platforms may deliver a variety of services useful to the application platforms and messaging applications. For example, service platform 1070 may deliver information exchange service 1071 which enables the routing of electronic message content. Service 1071 may also host remote programming instructions and render their results to messaging applications or browsers on any of the application platforms. Non-limiting examples of information exchange service 1071 include Microsoft® Exchange Server, Microsoft Office365™, Outlook.com™, and Gmail™.

In addition, service platform 1080 may deliver storage provider service 1081, which enables non-local storage of files or other data which can be utilized by messaging applications 1011, 1021, 1031, and 1041. For example, storage provider service 1081 might be a cloud storage provider, a database server, or a local area network file server. Non-limiting examples of storage provider services include Microsoft SkyDrive®, Google Drive™, DropBox™, Box™, and Microsoft® SQL Server.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A method comprising:
identifying a uniform resource locator (URL) in a message body of a composition interface for a message composed in an email application, the URL indicating a source of a document;
rendering the document within the message body as an interactive URL preview, the interactive URL preview enabling navigation to display different parts of the document while within the message body and enabling modification of content in the document displayed in the interactive URL preview while within the message body;
receiving a modification to the content in the document displayed in the interactive URL preview within the message body, wherein the modification includes editing the content in the document displayed in the interactive URL preview; and
updating the interactive URL preview to display the content comprising edits within the message body.

2. The method of claim 1, further comprising:
receiving an indication to send the message to a recipient after rendering the document within the message body as the interactive URL preview.

3. The method of claim 1, wherein the message is a rich text format message.

4. The method of claim 1, wherein the document comprises a productivity application file.

5. The method of claim 1, wherein rendering the document within the message body as the interactive URL preview comprises:
determining a file type of the document.

6. The method of claim 1, further comprising invoking a productivity application service to enable the modification of the content.

7. The method of claim 1, further comprising:
recognizing the URL as a link to a cloud storage; and
presenting a command element to adjust an access permission to the document displayed in the interactive URL preview within the message body.

8. The method of claim 7, further comprising:
in response to receiving a command to adjust the access permission to the document via the command element, initializing an access request; and
after receiving an indication to send the message, requesting the cloud storage to adjust the access permission according to the access request.

9. The method of claim 1, further comprising:
recognizing the URL as a link to a cloud storage; and
after receiving an indication to send the message to one or more recipients, requesting the cloud storage to adjust an access permission of the document for the one or more recipients.

10. The method of claim 1, wherein the modification to the content in the document displayed in the interactive URL preview is reflected in the document at the source.

11. One or more computer-readable storage media having stored thereon computer-executable instructions for performing a method comprising:
identifying a uniform resource locator (URL) in a message body of a composition interface for a message composed in an email application;
determining a file type of a document at a storage location to which the URL links;
launching a link rendering element to render the document within the message body as an interactive URL preview, the interactive URL preview enabling navigation to display different parts of the document while within the message body and enabling modification of content in the document displayed in the interactive URL preview while within the message body;
receiving a modification to the content in the document displayed in the interactive URL preview within the message body, wherein the modification includes editing the content in the document displayed in the interactive URL preview, and wherein the modification to the content in the document displayed in the interactive URL preview within the message body is reflected in the document at the storage location; and
updating the interactive URL preview to display the content comprising edits within the message body.

12. The media of claim 11, wherein the document comprises a hypertext markup language file.

13. The media of claim 11, wherein the document comprises a productivity application file, wherein the link rendering element invokes a productivity application service to provide interaction functionality for the productivity application file.

14. The media of claim 11, wherein the composition interface is presented in response to receiving a command for a new message, a command for a reply message, or a command for a forwarding message.

15. The media of claim 11, wherein the composition interface comprises the message body, a first input field for indicating one or more recipients of the message; and a send command element for receiving a command to send the message to the one or more recipients.

16. An apparatus comprising:
one or more computer readable storage media; and
an email application embodied in program instructions stored on the one or more computer readable storage media that, when executed by a computing system, direct the computing system to:
display a message composition interface for a message;
detect a uniform resource locator (URL) string input to a message body of the message composition interface;
determine a source represented by the URL string and a file type of a document at the source;
display the document within the message body as an interactive URL preview, the interactive URL preview enabling navigation to display different parts of the document within the message body and enabling modification of content in the document displayed in the interactive URL preview within the message body;
receive a modification to the content in the document displayed in the interactive URL preview within the message body, wherein the modification includes editing the content in the document displayed in the interactive URL preview of the document; and
update the interactive URL preview to display the content comprising edits within the message body.

17. The apparatus of claim 16, wherein the message is a rich text format message.

18. The apparatus of claim 16, wherein the program instructions further direct the computing system to:
invoke a productivity application service to display the document within the message body as the interactive URL preview.

19. The apparatus of claim 16, wherein the program instructions further direct the computing system to:

in response to the source being determined to be a cloud storage location of a cloud storage and after receiving an indication to send the message including the URL string, request the cloud storage to adjust an access permission of the document.

20. The apparatus of claim 16, wherein the program instructions further direct the computing system to:

in response to the source being determined to be a cloud storage location of a cloud storage, present a command element to adjust an access permission to the document in the message body of the message composition interface;

in response to receiving a command to adjust the access permission to the document via the command element, initialize an access request; and after receiving an indication to send the message, request the cloud storage to adjust the access permission according to the access request.

21. A method comprising:

identifying a uniform resource locator (URL) in a message body of a composition interface for a message composed in an email application, the URL indicating a source of a document;

rendering the document within the message body as an interactive URL preview, the interactive URL preview enabling navigation to display different parts of the document while within the message body and enabling modification of content in the document displayed in the interactive URL preview while within the message body;

receiving a modification to the content in the document displayed in the interactive URL preview within the message body, wherein the modification includes editing the content in the document displayed in the interactive URL preview, wherein the modification to content in the document displayed in the interactive URL preview of the document is reflected in the document at the source; and updating the interactive URL preview to display the content comprising edits within the message body.

\* \* \* \* \*